(12) United States Patent
Peterson

(10) Patent No.: US 7,270,429 B2
(45) Date of Patent: Sep. 18, 2007

(54) VEHICLE MIRROR WITH POWERED EXTENSION INCORPORATING SLIP CLUTCH

(75) Inventor: Kenneth C. Peterson, Comstock Park, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 0 days.

(21) Appl. No.: 10/595,021

(22) PCT Filed: Jun. 17, 2004

(86) PCT No.: PCT/US2004/019425

§ 371 (c)(1),
(2), (4) Date: Dec. 19, 2005

(87) PCT Pub. No.: WO2004/113126

PCT Pub. Date: Dec. 29, 2004

(65) Prior Publication Data

US 2006/0176591 A1    Aug. 10, 2006

Related U.S. Application Data

(60) Provisional application No. 60/320,292, filed on Jun. 19, 2003.

(51) Int. Cl.
*B60R 1/074* (2006.01)
*B60R 1/076* (2006.01)

(52) U.S. Cl. .......... 359/841; 359/877; 359/881
(58) Field of Classification Search .......... 359/841, 359/881, 877
See application file for complete search history.

(56) References Cited

U.S. PATENT DOCUMENTS

| 4,969,727 | A | 11/1990 | Eckert et al. | |
|---|---|---|---|---|
| 5,477,390 | A | 12/1995 | Rawlings et al. | |
| 6,213,609 | B1 | 4/2001 | Boddy et al. | |
| 6,234,637 | B1 | 5/2001 | Juraschek | |
| 6,325,518 | B1 * | 12/2001 | Whitehead et al. | 359/841 |
| 6,394,616 | B1 * | 5/2002 | Foote et al. | 359/841 |
| 6,582,087 | B2 * | 6/2003 | Whitehead et al. | 359/841 |

FOREIGN PATENT DOCUMENTS

EP    0220606 A    5/1987

* cited by examiner

*Primary Examiner*—Mark A. Robinson
(74) *Attorney, Agent, or Firm*—McGarry Bair PC

(57) ABSTRACT

The invention relates to an exterior vehicle mirror having a mirror assembly mounted to a vehicle. A drive assembly comprises a drive screw coupled to a motor and a drive nut threadably mounted on the drive screw. The rotation of the drive screw by the motor causes the drive nut to traverse the drive screw. As the drive nut traverses the drive screw, it causes the extension and retraction of the mirror assembly. A slip clutch is interposed between the motor and the drive screw to enable the motor to continue to operate without damage if the mirror assembly reaches full extension or retraction.

20 Claims, 7 Drawing Sheets

VEHICLE MIRROR WITH POWERED EXTENSION INCORPORATING SLIP CLUTCH

CROSS-REFERENCE TO RELATED APPLICATION

This application claims priority on International Application No. PCT/US04/019425, filed Jun. 17, 2004, which claims the benefit of U.S. Provisional Patent Application 60/320,292, filed Jun. 19, 2003, both are incorporated herein in their entirety.

BACKGROUND OF THE INVENTION

1. Field of Invention

The invention relates to an external vehicle mirror and, more particularly, to an external vehicle mirror having powered extension functionality accomplished by a single motor. In another aspect, the invention relates to a slip clutch for the powered extension function.

2. Description of the Related Art

External mirrors are ubiquitous for contemporary vehicles and have long been used to aid the driver in operating the vehicle, especially in improving the rearward view of the driver. Over time, more and more functionality has been incorporated into the external mirrors. For example, it is common to extend the external mirror away from the vehicle, which is useful when towing a trailer. Mirrors incorporating both a powered fold and powered extension functionality are well-known. Examples of such mirrors are disclosed in U.S. Pat. Nos. 6,276,808 and 6,213,609, assigned to the assignee of the current application, and are incorporated by reference.

In one embodiment of the powered extension function, the mirror is extended away from the vehicle by the motor-driven rotation of an elongated drive screw which causes a threaded drive nut to travel along the drive screw. The drive nut is connected to a frame piece to which is attached the reflective element, which translates relative to the drive screw with the movement of the drive nut. Depending upon the direction of rotation of the drive screw, the mirror is either extended away from the vehicle or retracted toward the vehicle.

In operating the powered extension function, the motor is frequently operated for a preselected time interval sufficient to fully extend or retract the mirror. However, this can result in the motor continuing to operate after the mirror has reached its limit of travel. When this occurs, the motor will be prevented from turning, which can cause overworking of the motor, contributing to overheating and/or premature failure. One approach to eliminating this problem is to utilize an electronic feedback system which can determine when the motor has begun to overwork and will terminate the operation of the motor. However, these systems can be complicated, can be expensive, require additional steps in the fabrication of the mirror, and additional weight to the mirror assembly, and can themselves fail.

SUMMARY OF THE INVENTION

In a first aspect, a vehicular mirror assembly comprises a base, a mirror housing having a reflective element therein, the mirror housing being mounted to the base for at least a normal path of movement between a retracted position where the mirror housing is adjacent the base and an extended position where the mirror housing is distal to the base, an actuator operatively mounted between the base and the mirror housing for selectively moving the mirror housing with respect to the base through the normal path of movement, and a slip clutch associated with the actuator for accommodating impeded movement of the mirror housing with respect to the base.

The impeded movement can comprise attempted movement of the mirror housing by the actuator beyond an outermost limit of the extended position, attempted movement of the mirror housing by the actuator beyond an innermost limit of the retracted position, or movement of the mirror housing by the actuator within the normal path of movement when acted upon by an opposing force, wherein the opposing force is an external force applied to the mirror housing during movement through the normal path of movement.

The actuator can comprise a drive assembly comprising a drive screw driven by a motor, and a drive nut threadably received thereon and connected to the mirror housing for extending the mirror housing between the retracted and extended positions when the drive nut moves longitudinally along the drive screw under action by the motor. The slip clutch can enable the drive screw to be rotated with the rotation of the motor when the movement of the drive nut is not impeded, or can enable the motor to rotate when the movement of the drive nut is impeded, or can enable the drive screw to be rotated when the drive nut is moved longitudinally along the drive screw and the motor does not rotate.

The drive screw can comprise at least one cylindrical surface, the slip clutch can comprise at least one arcuate finger, and the at least one arcuate finger can be biased into contact with the at least one cylindrical surface. A spring can bias the at least one arcuate finger into contact with the at least one cylindrical surface. The at least one cylindrical surface can comprise a plurality of coaxial, spaced cylindrical surfaces.

A second aspect of the invention comprises a slip clutch for a vehicular mirror assembly, the vehicular mirror assembly comprising a base, a mirror housing having a reflective element therein, the mirror housing being mounted to the base for at least a normal path of movement between a retracted position where the mirror housing is adjacent the base and an extended position where the mirror housing is distal to the base, and an actuator operatively mounted between the base and the mirror housing for selectively moving the mirror housing with respect to the base through the normal path of movement, wherein the slip clutch is associated with the actuator for accommodating impeded movement of the mirror housing with respect to the base.

DESCRIPTION OF AN EMBODIMENT OF THE INVENTION

Figure 1:
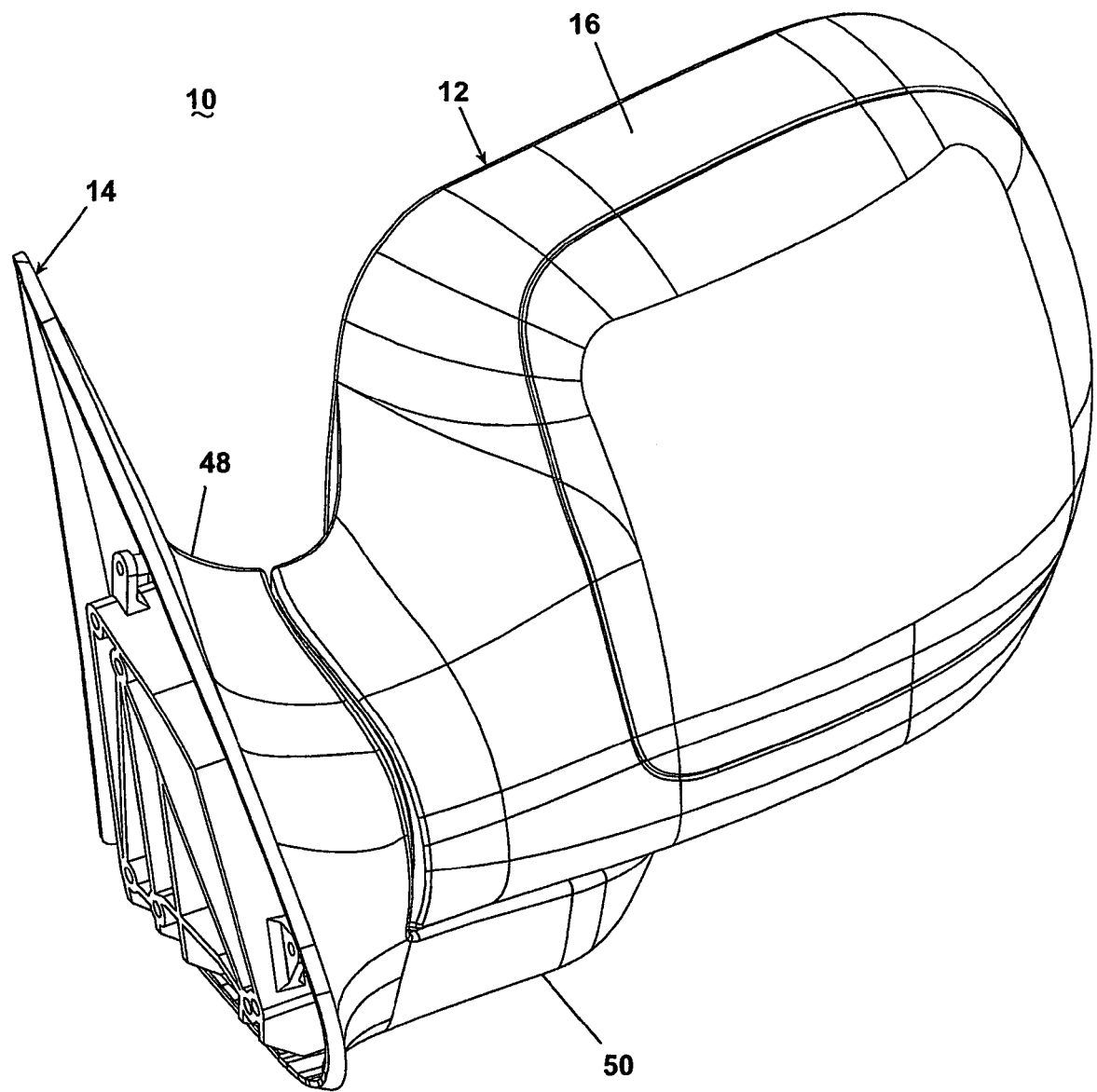
FIG. 1 is a left-front perspective view of an exterior power extend mirror according to the invention and comprising a mirror assembly mounted to a support bracket adapted to mount to a motor vehicle, with the mirror assembly shown in a retracted position.
Figure 2:
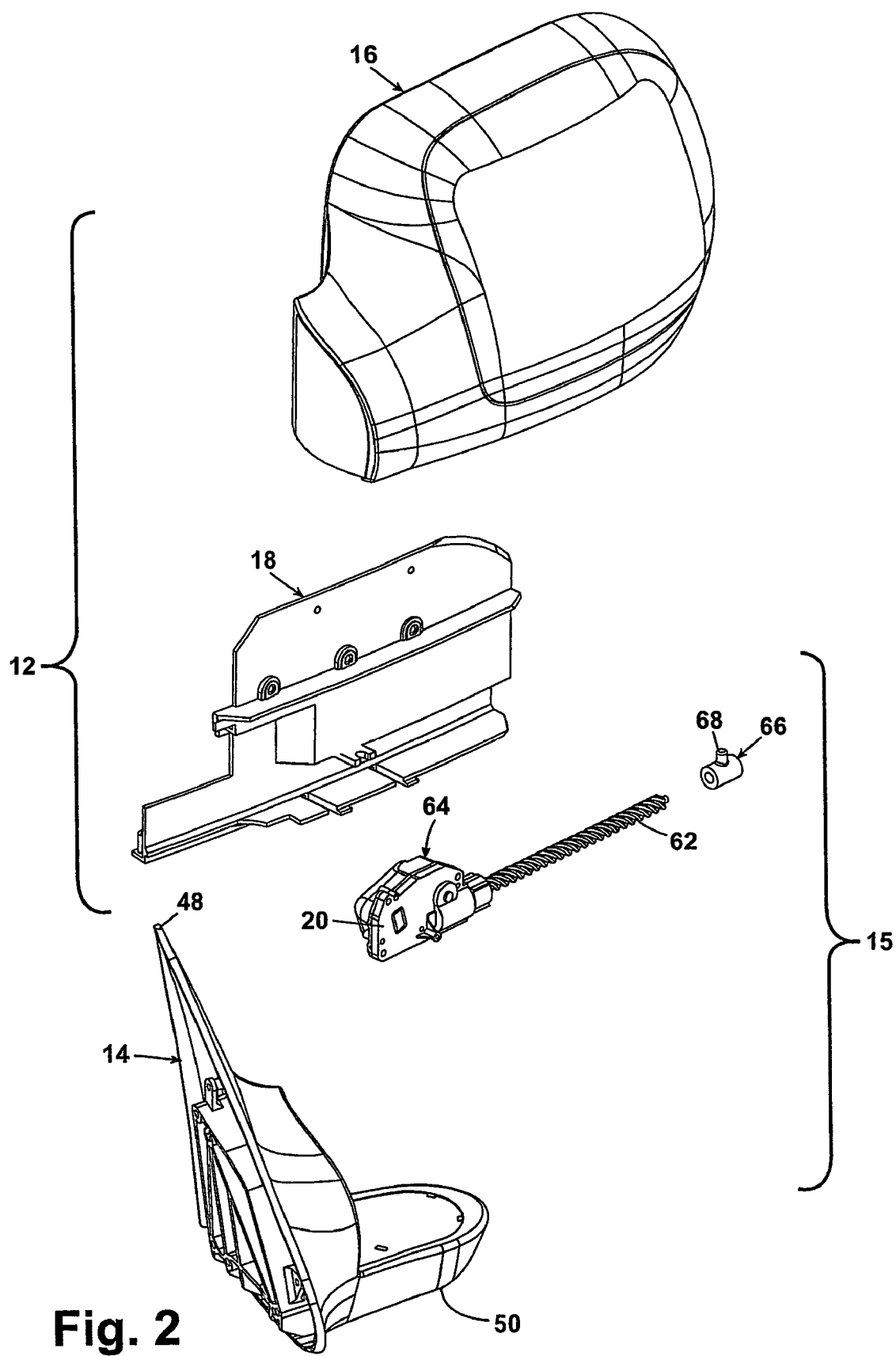
FIG. 2 is an exploded view of the power fold mirror of FIG. 1 and illustrates the major components comprising a drive assembly connecting the mirror assembly to the support bracket and for extending the mirror assembly relative to the vehicle, with the drive assembly comprising a drive screw having a drive nut that couples with a mirror bracket to extend the mirror housing.

FIG. 1 illustrates a vehicle mirror 10 having a power extend function according to the invention. The vehicle mirror 10 comprises a mirror assembly 12 and is mounted to a vehicle (not shown) by a suitable base such as a support bracket or arm 14. A powered drive assembly is used to selectively extend the mirror 10 away from the vehicle, thereby enhancing the rearward view of the driver, and retract the mirror 10 toward the vehicle, when an enhanced rearward view is not needed. Referring to FIG. 2, the mirror assembly 12 comprises a drive assembly 15, which is used to extend the mirror assembly between retracted and extended positions, as shown and described in the U.S. application for patent filed Apr. 22, 2003, entitled "Vehicular Mirror System With At Least One Of Power-Fold And Power-Extend Functionality" and which is incorporated fully herein by reference.

The drive assembly 15 comprises a slip clutch for accommodating impeded movement of the mirror assembly 12 with respect to the support bracket 14, as hereinafter described. The slip clutch of the present invention can find applicability in a variety of extendable mirror constructions, including mirror constructions such as are disclosed in U.S. Pat. Nos. 6,598,983; 6,582,087; 6,497,491; 6,439,730; 6,394,616; 6,390,635; 6,325,518; 6,276,808; 6,239,928; 6,213,609; 6,139,159; 6,116,743; 6,113,241; 5,969,890; 5,903,402; and 5,483,385, the entire disclosures of which are hereby incorporated by reference herein.

The mirror assembly 12 comprises a mirror housing 16 in which is received a mirror bracket 18 to which is mounted a well-known reflective element assembly (not shown). The support arm 14 comprises a shoulder 48 adapted to mount to the vehicle and a base 50 extending laterally from the shoulder. Referring to FIG. 2, the drive assembly 15 comprises a drive screw 62 coupled to an electric motor assembly 64, which rotates the drive screw 62 about the longitudinal axis of the drive screw 62. An internally threaded drive nut 66 is threadably received on the drive screw 62 and comprises a pin 68 extending laterally from the drive nut 66 along an axis that is perpendicular to the longitudinal axis of the drive screw 62. The pin 68 is adapted for attachment to the mirror bracket 18. Other means for connecting the mirror bracket 18 to the drive nut 66 can be utilized, such as providing the mirror bracket 18 with a drive nut formed integrally therein.

Figure 3:
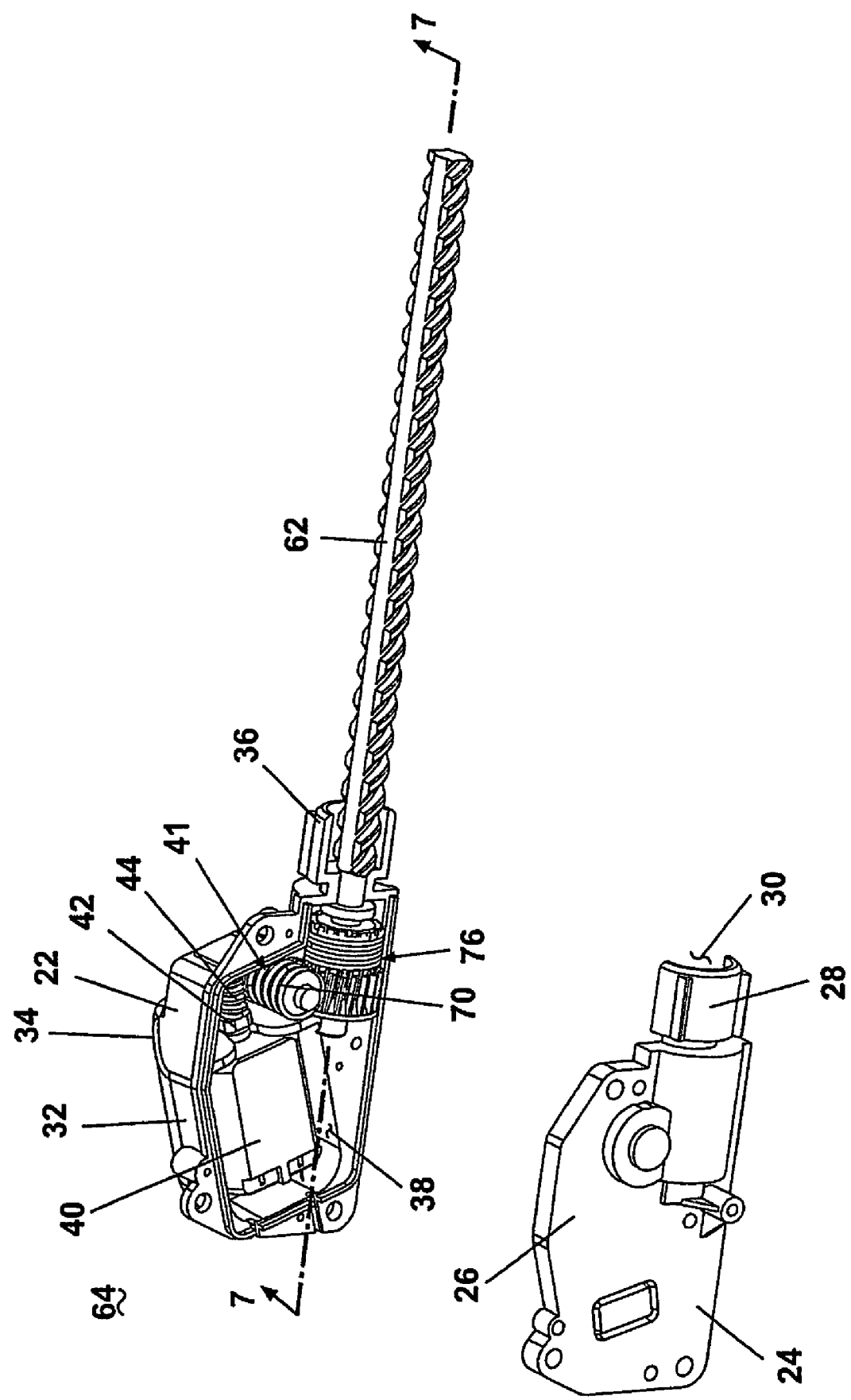
FIG. 3 is a partially-exploded close-up view of the drive assembly of FIG. 2 illustrating a motor, a gear assembly, a slip clutch assembly, and the drive screw.

Referring now to FIG. 3, the electric motor assembly 64 comprises a motor assembly casing 20 and the drive screw 62. The motor assembly casing 20 comprises a base 22 and a cover 24. The base 22 is an irregularly-shaped body having a perimeter wall 32 and a bottom wall 34 forming a motor chamber 38 therein. The motor chamber 38 is adapted to hold a motor 40 and a gear assembly 41 in cooperating relationship as hereinafter described. The base 22 terminates at one corner in a semi-annular collar portion 36. The collar portion 36 terminates inwardly in an annular bearing wall 98. An annular end wall 52 is provided further inwardly of the bearing wall 98 in coaxial alignment with the bearing wall 98 and the collar portion 36. The end wall 52 terminates in a circular well 100.

The cover 24 is an irregularly-shaped body having a generally flattened profile and comprising a plate 26 having a shape cooperative with the perimeter wall 32 and a semi-annular collar portion 28. The cover 24 is adapted to closely fit with the base 22 to form the motor chamber 38. The collar portion 28 is adapted for cooperative communication with the collar portion 36 to form an annular collar defining a screw aperture 30 therethrough which communicates with the motor chamber 38. The cover 24 and the base 22 are provided with suitable means, such as tabs, posts, and apertures, to ensure a proper fit of the cover 24 to the base 22, and with suitable mounting apertures for attaching the motor assembly casing 20 to the base 50.

Figure 4:
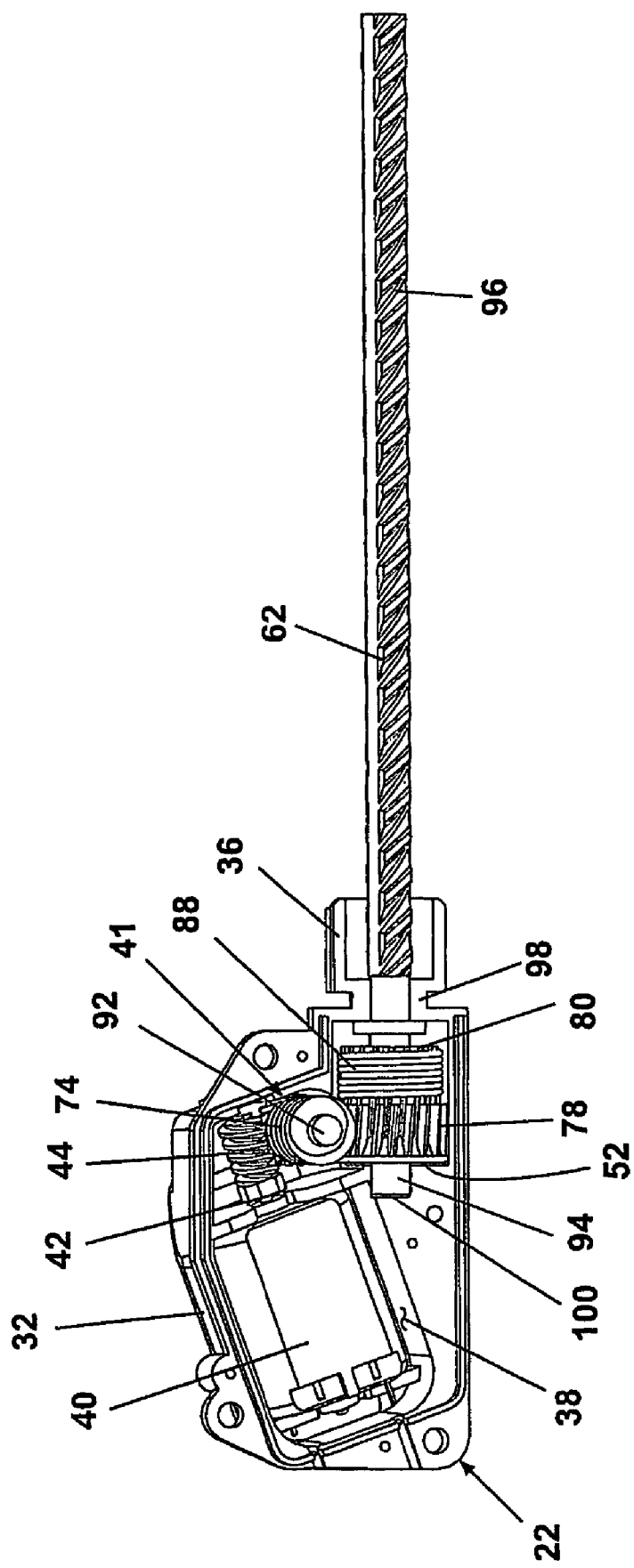
FIG. 4 is a side view of the drive assembly of FIG. 3 showing the relative location of the motor, gear assembly, slip clutch assembly, and drive screw.
Figure 6:
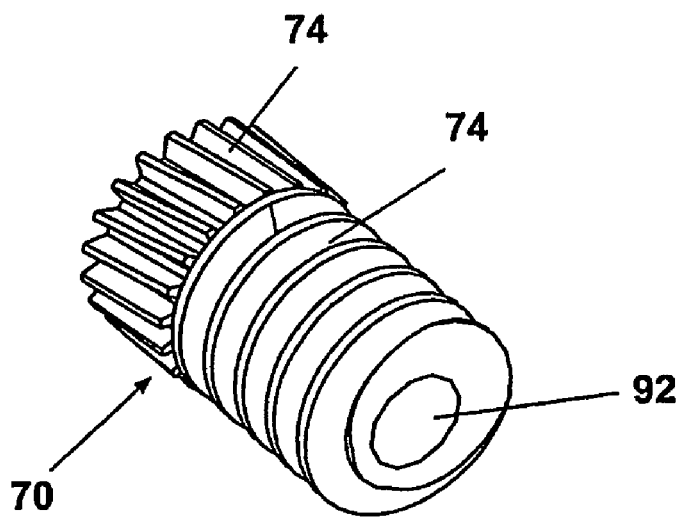
FIG. 6 is a perspective view of a transfer gear comprising a portion of the gear assembly of FIG. 4.

Referring also to FIG. 4, the motor 40 comprises a generally conventional 12-volt electric motor of suitable size and power for the purposes described herein, having a motor shaft 42. A motor worm 44 comprises a conventional worm gear, and is fixedly mounted to the motor shaft 42 for rotation therewith. Referring also to FIG. 6, a transfer gear 70 comprises a generally cylindrical gear having a cogwheel portion 72 and a worm portion 74 in coaxial alignment. The cogwheel portion 72 is adapted for threaded communication with the motor worm 44 so that the transfer gear 70 will rotate with the rotation of the motor worm 44. The worm portion 74 terminates in a first stub axle 92 in coaxial alignment therewith. The cogwheel portion 72 similarly terminates in a second stub axle (not shown). The first stub axle 92 is adapted to be received in a mating well (not shown) in the cover 24 for rotation therein. The second stub axle is adapted to be received in a mating well (not shown) in the base 22 for rotation therein.

Figure 5:
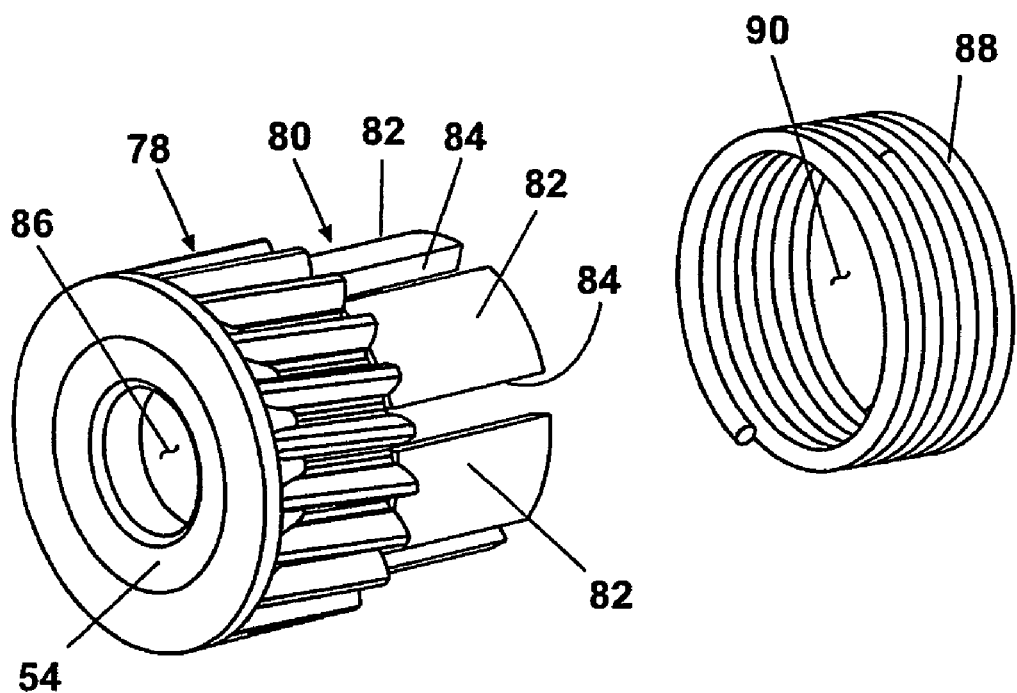
FIG. 5 is an exploded view of the slip clutch assembly of FIG. 4.

Referring now to FIG. 5, a slip clutch assembly 76 comprises a toothed cogwheel portion 78 and a toothed clutch portion 80 in coaxial alignment. The cogwheel portion 78 terminates in a coaxial annular wall 54. An aperture 86 extends coaxially through the cogwheel portion 78, the clutch portion 80, and the annular wall 54. The clutch portion 80 has a diameter somewhat smaller than the diameter of the cogwheel portion 78, and comprises a plurality of longitudinal fingers 82 extending away from the cogwheel portion 78 separated by longitudinal slots 84 which enable the fingers 82 to flex radially inwardly. A coil spring 88 has an aperture 90 therethrough adapted for frictional insertion over the clutch portion 80. The coil spring 88 exerts a compressive force to the clutch portion 80 which urges the fingers 82 to deflect radially inwardly. The cogwheel portion 78 is adapted for threaded communication with the worm portion 74 so that the slip clutch assembly 76 will rotate with the rotation of the transfer gear 70. As shown in FIG. 4, the transfer gear 70 is oriented generally orthogonally to the motor worm 44, and the slip clutch assembly 76 is oriented generally orthogonally to the transfer gear 70.

Figure 7:
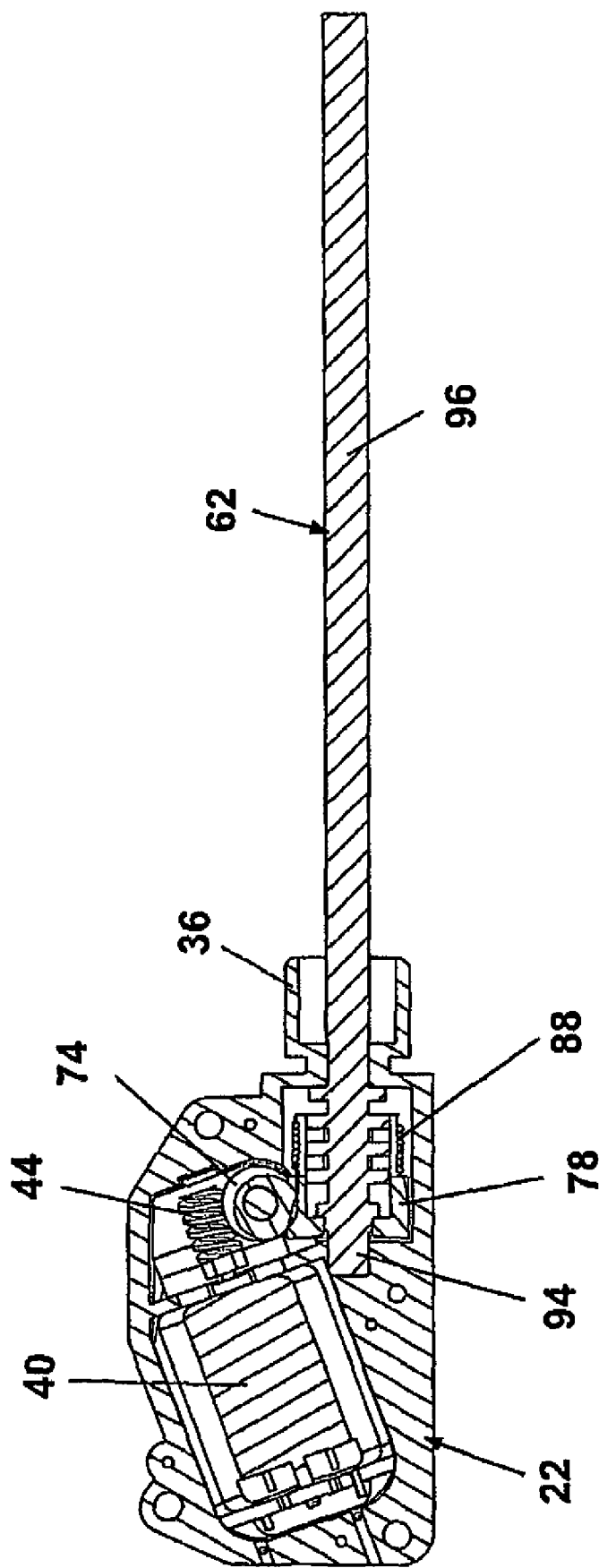
FIG. 7 is a cross-sectional view of the drive assembly of FIG. 3 taken a long line 7-7.
Figure 8:
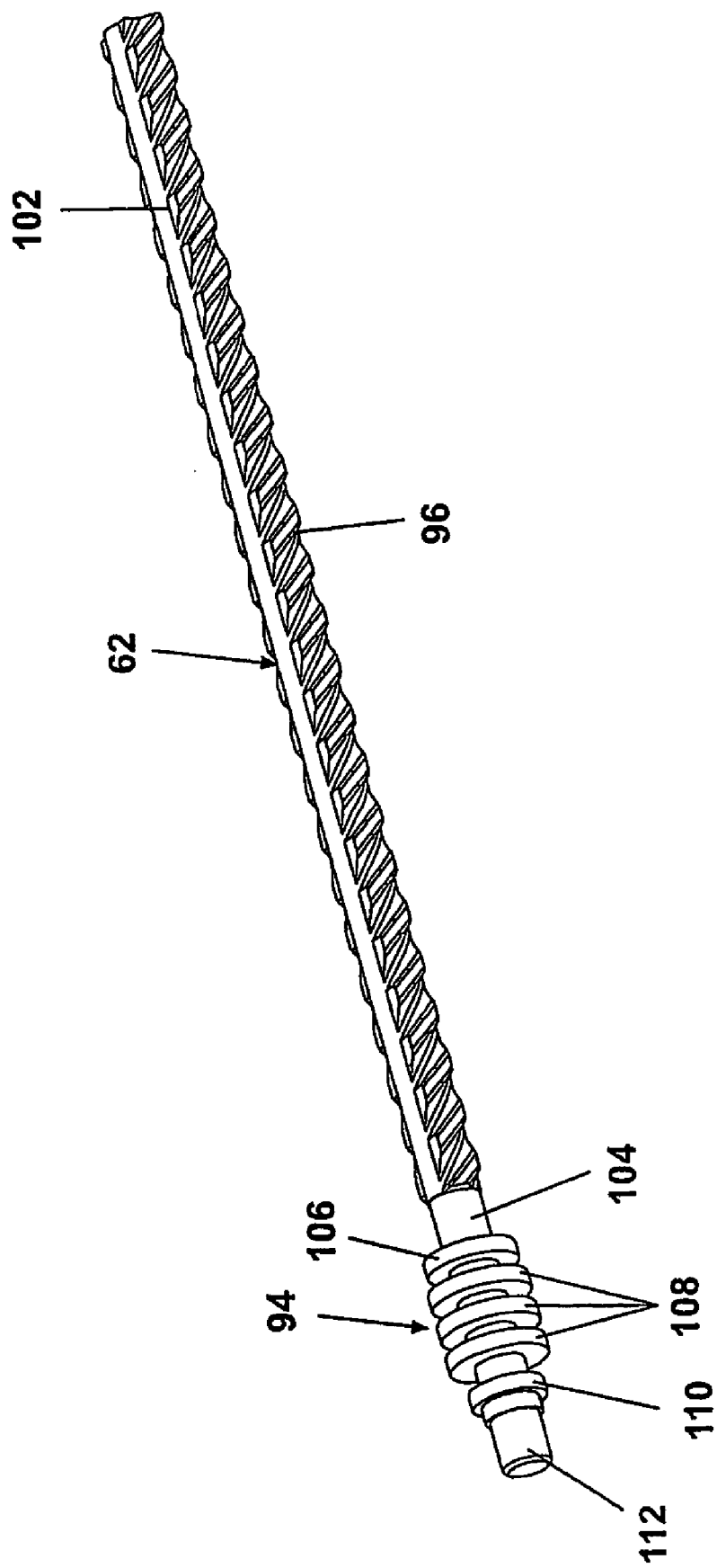
FIG. 8 is a perspective view of the drive screw of FIG. 4.

Referring now to FIG. 7, the drive screw 62 is an elongated, rod-like member comprising a shaft bearing portion 94 at a first end and a threaded portion 96. The drive screw 62 preferably comprises a high-strength plastic fabricated through a suitable molding processor, such as injection molding. The bearing portion 94 comprises a smooth shaft 104 terminating in a bearing end 112. Adjacent the bearing end 112 is an annular retainer flange 110. Spaced away from the retainer flange 110 is a plurality of annular, plate-like bearing flanges 108, shown in FIG. 7 as numbering three, in parallel, spaced-apart relationship. The annular bearing flanges 108 are adapted for frictional communication with the fingers 82 as hereinafter described. Alternatively, a single, solid, cylinder-shaped flange having a length equivalent to the overall length of the three flanges 108 can be used. However, the plurality of flanges 108 minimizes the presence of dimensional imperfections in a solid flange that would adversely impact the performance of the clutch resulting during the fabrication process. Adjacent the bearing flanges 108 is an annular end flange 106.

The threaded portion 96 is adapted for threadable communication with the drive nut 66. The pitch of the threads comprising the threaded portion 96 and of the threads comprising the drive nut 66 are adapted so that, if sufficient longitudinally-directed force is applied to the drive nut 66, the drive screw 62 will be urged to rotate, provided that the longitudinally-directed force is sufficient to overcome the frictional force between the slip clutch assembly 76 and the shaft bearing portion 94 as the drive screw 62 rotates. The threaded portion 96 is also provided with a truncated flat 102 extending the length thereof, which enables the drive screw 62 to be injection molded with the mold separating in a direction perpendicular to the longitudinal axis of the drive screw 62. This eliminates undercuts occurring with uninterrupted threads which would prevent the drive screw 62 from being properly ejected from the mold cavity.

Referring again to FIG. 4 and to FIG. 6, the drive screw 62 is mounted in the motor assembly casing 20 by inserting the bearing end 112 in a well 100 adapted for rotation of the bearing end 112 therein. The smooth shaft 104 is held in a bearing 98 intermediate the collar portion 36 and the motor chamber 38 for slidable rotation of the smooth shaft 104 therein. The end flange 106 bears against the bearing 98 as shown in FIG. 6 to retain the bearing end 112 in the well 100 and prevent the drive screw 62 from translating relative to the motor assembly casing 20.

The bearing portion 94 is inserted into the aperture 86 of the slip clutch assembly 76 so that the retainer flange 110 bears against the annular wall 54 to retain the slip clutch assembly 76 in contact with the end wall 52 and prevent of the translation of the slip clutch assembly 76 relative to the motor assembly casing 20. As so assembled, the fingers 82 will be urged radially inwardly to frictionally bear against the bearing flanges 108 by the compressive force of the coil spring 88. Thus, the drive screw 62 will be urged to rotate by the rotation of the slip clutch assembly 76. However, should the drive screw 62 be prevented from rotation, such as by interference with the linear movement of the drive nut 66, the frictional force between the fingers 82 and the bearing flanges 108 will be overcome, thereby allowing the slip clutch assembly 76 to continue to rotate. The compressive force exerted by the coil spring 88, and the number, spacing, and size of the bearing flanges 108 can be selected to adjust the frictional force that must be overcome in order to enable the rotation of the slip clutch assembly 76 relative to the drive screw 62.

The slip clutch assembly described herein enables the motor to continue to operate after the mirror has reached its fully extended or fully retracted position, thereby reducing motor wear and premature failure. The slip clutch assembly is simple, and readily adjustable by appropriate selection of the coil spring for adjustment of the frictional force that must be overcome. The slip clutch assembly, in combination with the selection of an appropriate thread pitch for the drive screw and the drive nut, enables the manual extension and retraction of the mirror.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicular mirror assembly, comprising:
   a base;
   a mirror housing having a reflective element therein, the mirror housing being mounted to the base for at least a normal path of movement between a retracted position where the mirror housing is adjacent the base and an extended position where the mirror housing is distal to the base;
   an actuator operatively mounted between the base and the mirror housing for selectively moving the mirror housing with respect to the base through the normal path of movement, the actuator comprising:
      a drive screw driven by a motor and comprising at least one cylindrical surface; and
      a drive nut threadably received thereon and connected to the mirror housing for extending the mirror housing between the retracted and extended positions when the drive nut moves longitudinally along the drive screw under action by the motor; and
   a slip clutch associated with the actuator for accommodating impeded movement of the mirror housing with respect to the base, the slip clutch comprising at least one arcuate finger;
   wherein, the at least one arcuate finger is biased into contact with the at least one cylindrical surface so that the slip clutch rotates with the cylindrical surface during the normal path of movement and slips with respect to the cylindrical surface during impeded movement to prevent damage to the motor.

2. A vehicular mirror assembly according to claim 1, wherein the impeded movement comprises attempted movement of the mirror housing by the actuator beyond an outermost limit of the extended position.

3. A vehicular mirror assembly according to claim 1, wherein the impeded movement comprises attempted movement of the mirror housing by the actuator beyond an innermost limit of the retracted position.

4. A vehicular mirror assembly according to claim 1, wherein the impeded movement comprises movement of the mirror housing by the actuator within the normal path of movement when acted upon by an opposing force.

5. A vehicular mirror assembly according to claim 4, wherein the opposing force is an external force applied to the mirror housing during movement through the normal path of movement.

6. A vehicular mirror assembly according to claim 1, wherein the slip clutch enables the drive screw to be rotated with the rotation of the motor when the movement of the drive nut is not impeded.

7. A vehicular mirror assembly according to claim 1, wherein the slip clutch enables the motor to rotate when the movement of the drive nut is impeded.

8. A vehicular mirror assembly according to claim 1, wherein the slip clutch enables the drive screw to be rotated when the drive nut is moved longitudinally along the drive screw and the motor does not rotate.

9. A vehicular mirror assembly according to claim 1, wherein a spring biases the at least one arcuate finger into contact with the at least one cylindrical surface.

10. A vehicular mirror assembly according to claim 1, wherein the at least one cylindrical surface comprises a plurality of coaxial, spaced cylindrical surfaces.

11. A slip clutch for a vehicular mirror assembly, the vehicular mirror assembly comprising a base, a mirror housing having a reflective element therein, the mirror housing being mounted to the base for at least a normal path of movement between a retracted position where the mirror housing is adjacent the base and an extended position where the mirror housing is distal to the base, and an actuator operatively mounted between the base and the mirror housing for selectively moving the mirror housing with respect to the base through the normal path of movement;

wherein the slip clutch is associated with the actuator for accommodating impeded movement of the mirror housing with respect to the base and comprises at least one arcuate finger, and the actuator comprises:

a drive screw comprising at least one cylindrical surface and driven by a motor; and a drive nut threadably received thereon and connected to the mirror housing for extending the mirror housing between the retracted and extended positions when the drive nut moves longitudinally along the drive screw under action by the motor;

and the at least one arcuate finger is biased into contact with the at least one cylindrical surface so that the slip clutch rotates with the cylindrical surface during the normal path of movement and slips with respect to the cylindrical surface during impeded movement to prevent damage to the motor.

12. A slip clutch according to claim 11, wherein the impeded movement comprises attempted movement of the mirror housing by the actuator beyond an outermost limit of the extended position.

13. A slip clutch according to claim 11, wherein the impeded movement comprises attempted movement of the mirror housing by the actuator beyond an innermost limit of the retracted position.

14. A slip clutch according to claim 11, wherein the impeded movement comprises movement of the mirror housing by the actuator within the normal path of movement when acted upon by an opposing force.

15. A slip clutch according to claim 14, wherein the opposing force is an external force applied to the mirror housing during movement through the normal path of movement.

16. A slip clutch according to claim 11, wherein the slip clutch enables the drive screw to be rotated with the rotation of the motor when the movement of the drive nut is not impeded.

17. A slip clutch according to claim 11, wherein the slip clutch enables the motor to rotate when the movement of the drive nut is impeded.

18. A slip clutch according to claim 11, wherein the slip clutch enables the drive screw to be rotated when the drive nut is moved longitudinally along the drive screw and the motor does not rotate.

19. A slip clutch according to claim 11, wherein a spring biases the at least one arcuate finger into contact with the at least one cylindrical surface.

20. A slip clutch according to claim 11, wherein the at least one cylindrical surface comprises a plurality of coaxial, spaced cylindrical surfaces.

* * * * *